US011901653B2

United States Patent
Buechling et al.

(10) Patent No.: US 11,901,653 B2
(45) Date of Patent: Feb. 13, 2024

(54) MODULE CONNECTOR WITH AT LEAST ONE DISPLACEABLE CONTACT ASSEMBLY

(71) Applicant: TE Connectivity Germany GmbH, Bensheim (DE)

(72) Inventors: Chris Buechling, Bensheim (DE); Frank Kaehny, Bensheim (DE); Manuel Eheim, Bensheim (DE); Marcus Wolf, Bensheim (DE); Bjoern Hoffmann, Bensheim (DE); Alexander Weber, Bensheim (DE); Patrick Distler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 95 days.

(21) Appl. No.: 17/579,199

(22) Filed: Jan. 19, 2022

(65) Prior Publication Data
US 2022/0231436 A1  Jul. 21, 2022

(30) Foreign Application Priority Data
Jan. 19, 2021  (DE) .......................... 102021100997.9

(51) Int. Cl.
*H01R 11/09* (2006.01)
*H01M 50/503* (2021.01)
(Continued)

(52) U.S. Cl.
CPC .......... *H01R 11/09* (2013.01); *H01M 50/503* (2021.01); *H01M 2220/20* (2013.01); *H01R 4/308* (2013.01); *H01R 4/34* (2013.01)

(58) Field of Classification Search
CPC .......... H01R 11/09; H01R 4/308; H01R 4/34; H01R 4/70; H01R 11/12; H01R 4/30;
(Continued)

(56) References Cited

U.S. PATENT DOCUMENTS 5,804,770 A * 9/1998 Tanaka ................ H01M 50/591
                                                    174/138 F
6,010,375 A * 1/2000 Higuchi ............... H01R 11/283
                                                    439/522
(Continued)

FOREIGN PATENT DOCUMENTS

CN    210897465 U    6/2020
CN    111370880 A    7/2020
(Continued)

OTHER PUBLICATIONS

German Office Action, App. No. 10 2021 100 997.9, dated Jun. 2, 2021, 5 pages.
(Continued)

*Primary Examiner* — Briggitte R. Hammond
(74) *Attorney, Agent, or Firm* — Barley Snyder

(57) ABSTRACT

A module connector for electrically connecting a pair of electric modules includes a pair of contact assemblies spaced from one another and fastening the module connector to the electric modules, a conductor assembly electrically connecting the contact assemblies and, with the contact assemblies, forming an electrical connection between the electric modules, and a housing formed of an electrically insulating material. The contact assemblies and the conductor assembly are accommodated in the housing. At least one of the contact assemblies is fastened to the conductor assembly in a manner displaceable relative to the conductor assembly in a direction of displacement directed towards and/or away from the other of the contact assemblies.

15 Claims, 2 Drawing Sheets

(51) Int. Cl.
*H01R 4/30* (2006.01)
*H01R 4/34* (2006.01)

(58) Field of Classification Search
CPC . H01R 11/26; H01M 50/503; H01M 2220/20; H01M 50/502; H01M 50/249
See application file for complete search history.

(56) References Cited

U.S. PATENT DOCUMENTS

| | | | |
|---|---|---|---|
| 10,415,441 | B2 | 9/2019 | Sueoka et al. |
| 2015/0025884 | A1 | 9/2015 | Kanagawa |
| 2018/0375227 | A1* | 12/2018 | Kaehny ............... H01R 4/34 |
| 2020/0118778 | A1 | 4/2020 | Oda et al. |
| 2020/0403329 | A1* | 12/2020 | Durse ................. H01R 11/288 |

FOREIGN PATENT DOCUMENTS

| | | |
|---|---|---|
| DE | 10 2013 212 348 A1 | 12/2014 |
| DE | 10 2018 203 578 A1 | 9/2019 |
| EP | 0765005 A2 | 3/1997 |
| JP | 19106802 A | 4/1997 |
| JP | 492367 B1 | 5/2008 |
| JP | 2015167097 A | 9/2015 |
| JP | 201789532 A | 5/2017 |
| JP | 20199115 A | 1/2019 |

OTHER PUBLICATIONS

Copper Busbar Experts Custom PVC Covers, RHI Product Catalogue, www.r-hi.net, downloaded Sep. 12, 2020, 7 pages.
Office Action from Japan's Patent Office dated Jan. 31, 2023, corresponding to Application No. 2022-004077 with English translation, 9 pages.
Search Report and Written Opinion from the Intellectual Property Office of France dated Mar. 17, 2023, corresponding to Application No. FR 2200410, 10 pages.

* cited by examiner

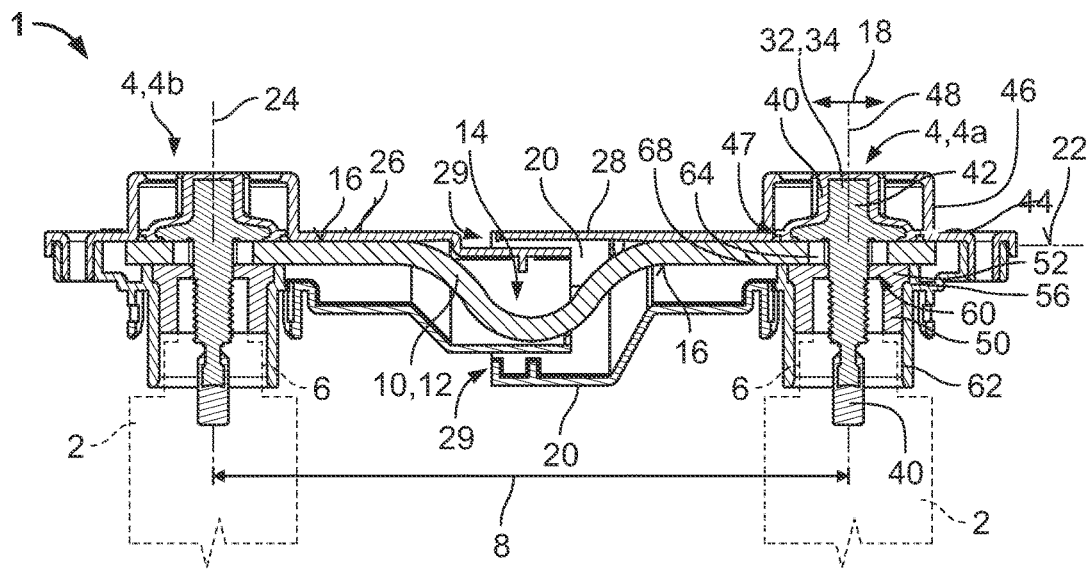
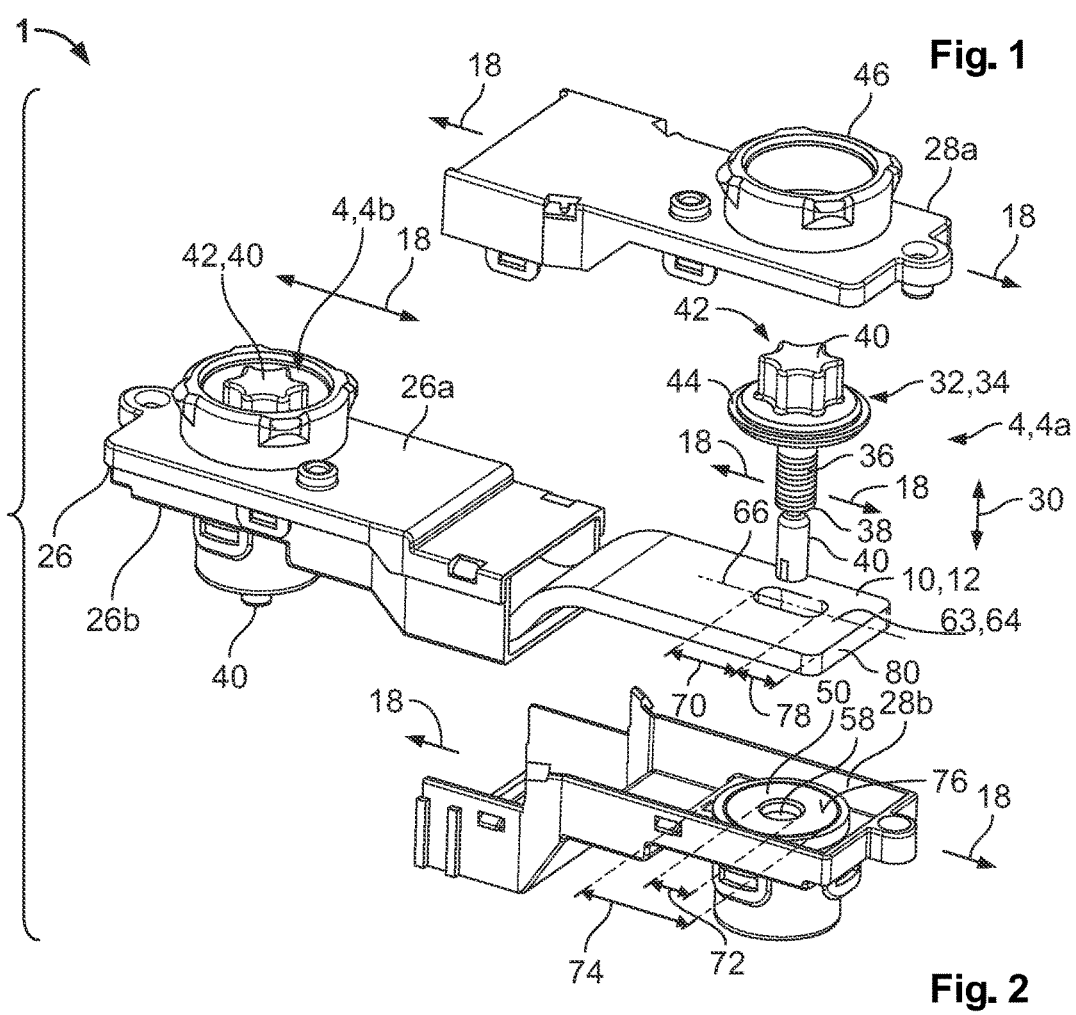
Fig. 1
Fig. 2

MODULE CONNECTOR WITH AT LEAST ONE DISPLACEABLE CONTACT ASSEMBLY

CROSS-REFERENCE TO RELATED APPLICATIONS

This application claims the benefit of the filing date under 35 U.S.C. § 119(a)-(d) of German Patent Application No. 102021100997.9, filed on Jan. 19, 2021.

FIELD OF THE INVENTION

The invention relates to a module connector for electrically connecting two electric modules and, more particularly, to a module connector for connecting two battery modules.

BACKGROUND

The distance between the two electric modules connected to a module connector can deviate from a predetermined reference distance, even if the electric modules are arranged in a grid dimension. Known module connectors are not able to compensate for such positional deviations.

SUMMARY

A module connector for electrically connecting a pair of electric modules includes a pair of contact assemblies spaced from one another and fastening the module connector to the electric modules, a conductor assembly electrically connecting the contact assemblies and, with the contact assemblies, forming an electrical connection between the electric modules, and a housing formed of an electrically insulating material. The contact assemblies and the conductor assembly are accommodated in the housing. At least one of the contact assemblies is fastened to the conductor assembly in a manner displaceable relative to the conductor assembly in a direction of displacement directed towards and/or away from the other of the contact assemblies.

BRIEF DESCRIPTION OF THE DRAWINGS

The invention will now be described by way of example with reference to the accompanying FIGURES, of which:

FIG. 1 is a sectional side view of a module connector according to an embodiment;

FIG. 2 is an exploded perspective view of the module connector; and

DETAILED DESCRIPTION OF THE EMBODIMENT(S)

Figure 3:
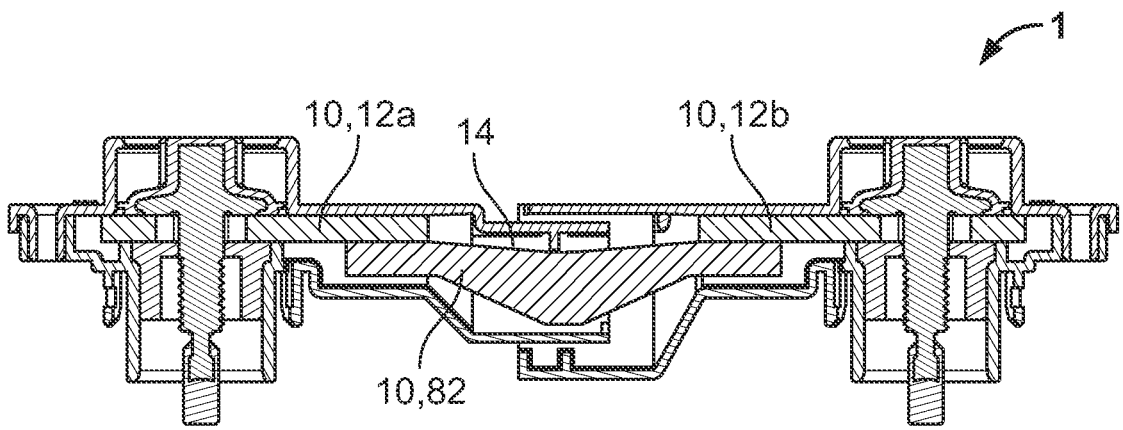
FIG. 3 is a sectional side view of a module connector according to another embodiment.

The invention shall be explained hereafter by way of example on the basis of different, merely exemplary configurations with reference to the drawings. The individual configurations merely reproduce a possible combination of features. Individual features of a configuration can be omitted in accordance with the explanations herein if the technical effect associated with the respective feature is not crucial for a particular application. Conversely, a feature can be added to a configuration described if the technical effect associated with this feature is crucial for a particular application of the configuration. In the drawings, the same reference characters are used for features which correspond to one another with regard to function and/or structure.

Shown in FIGS. 1 and 2 is a module connector 1 which connects two electric modules 2, for example, two battery modules, in particular battery modules 2 of an electric vehicle, to one another in an electrically conductive manner. Module connector 1 comprises two contact assemblies 4 spaced from one another which serve to establish electrical contact with electric modules 2 and to fasten module connector 1 to electric modules 2.

For the electrical and mechanical connection to a contact assembly 4, an electric module 2 is provided with a contact and fastening point 6 which is configured to be complementary to contact assembly 4, as shown in FIG. 1. A distance 8 between contact and fastening points 6 of the electric modules 2 to be connected is typically predetermined, but can deviate from a predetermined reference distance.

Module connector 1 comprises a conductor assembly 10, shown in FIGS. 1 and 2, which electrically connects both contact assemblies 4. Conductor assembly 10 can be a power rail 12 extending end-to-end between both contact assemblies 4. Power rail 12 can have an arch 14, in particular a U-shaped arch, in an embodiment between both contact assemblies 4, in order to compensate for changes in length of conductor assembly 10 due to temperature fluctuations. Power rail 12, in an embodiment, has a rectangular conductive cross section, flat sides 16 of which point in the direction towards and away from electric modules 2. Other conductive cross sections, for example, square, polygonal, circular, oval, or U-shaped, are also possible.

At least one contact assembly 4a is displaceable in a direction of displacement 18 shown in FIGS. 1 and 2 relative to conductor assembly 10 in the direction toward the other contact assembly 4b or away therefrom. This makes it possible to compensate for deviations from predetermined distance 8, changing the distance between the contact assemblies 4a, 4b; the one displaceable contact assembly 4 must simply be moved relative to the conductor assembly 10. In contrast to the curved and flexible conductor assemblies, which have to be bent open elastically to compensate for different distances between the modules, the solution according to the invention enables a force-free change in the distance 8 during installation. For length compensation, it is sufficient if only one displaceable contact assembly 4a is provided. In an embodiment, however, contact assemblies 4 of a module connector 1 are configured to be identical, so that both contact assemblies 4a, 4b are displaceable.

Module connector 1, as shown in FIG. 1, comprises a housing 20 in which conductor assembly 10 and contact assemblies 4 are accommodated. The housing 20 is fabricated from electrically insulating material and, at least in the region of contact assemblies 4, is part of a finger and touch protection that conforms in particular to standards and prevents contact with live parts.

In order to compensate for different distances 8, displaceable contact assembly 4a can be arranged to be displaceable in housing 20. In an embodiment, however, displaceable contact assembly 4a is coupled rigidly to housing 20 with respect to direction of displacement 18. Displaceable contact assembly 4a can be displaced together with housing 20 in direction of displacement 18, and in an embodiment in a plane 22 parallel to direction of displacement 18.

Plane 22, shown in FIG. 1, extends perpendicularly about a pivot axis 24, about which one contact assembly, for example, displaceable contact assembly 4a, can be pivoted about other contact assembly 4 or 4b, respectively. Pivot axis 24 extends through one contact assembly 4 and runs perpendicular to the connecting line between both contact assemblies 4 or the same elements of both contact assemblies 4, respectively. The remainder of module connector 1 can be pivoted about contact assembly 4 through which pivot axis 24 passes, so that the former can be aligned accordingly during assembly. A pivot axis 24 can extend through each of both contact assemblies 4, 4a, 4b so that (remaining) module connector 1 can be pivoted about each contact assembly 4, 4a, 4b. This makes it possible to align the module connector 1 correctly for connecting the two electric modules 2. The contact assembly 4, about which the remainder of the module connector 1 is pivotable, can be displaceable or fixed with respect to the conductor assembly 10.

Housing 20 can comprise two housing parts 26, 28, shown in FIGS. 1 and 2, which are displaceable relative to one another in direction of displacement 18. Housing parts 26, 28 can form a guide 29 which limits the movability of both housing parts 26, 28 to a displaceability in direction of displacement 18. For example, housing 20 can be configured to be telescopic to follow the change in the distance 8 without gaps arising through which contact with a current-carrying element could be established. For this purpose, one housing part 26 can be inserted into the other housing part 28. Two telescopic housing parts 26, 28 can overlap in particular in the middle between both contact assemblies 4. If arch 14 is arranged at this point, then the inner clear width of both housing parts 26 can be increased accordingly in order to be able to accommodate arch 14 during the telescopic motion. The inner clear width of housing parts 26 can decrease towards contact assemblies 4.

In other embodiments, more than two telescopic housing parts 26, 28 can also be present. For example, a third housing part can be arranged centrally between two outer housing parts. The two outer housing parts can be inserted to be displaceable into the central housing part or the central housing part can be inserted to be displaceable into the two outer housing parts.

In each of the housing parts 26, 28, one of two contact assemblies 4 is retained to be immovable relative to the respective housing part 26, 28 at least in direction of displacement 18, an in an embodiment in plane 22 containing direction of displacement 18.

One or each housing part 26, 28 can be formed by two or more housing shells 26a, 26b, 28a, 28b shown in FIG. 2. Housing shells 26a, 26b or 28a, 28b can be assembled, for example, clipped together, in an embodiment perpendicular to plane 22 or in an assembly direction 30 pointing towards electric modules 2 or in an assembly direction 30 pointing along pivot axis 24, respectively. In this way, a contact assembly 4 and a section of conductor assembly 10 can be placed into a housing part 26, 28, whereupon two housing shells 26a, 26b or 28a, 28b, respectively, are closed around the respective contact assembly 4 and the respective section of conductor assembly 10. In this way, conductor assembly 10 and contact assembly 4 are retained in a captive manner in housing 20 or in respective housing part 26, 28, respectively. Which housing part 26, 28 is inserted into other housing part 28, 26 is irrelevant.

The compensation of a change in distance 8 between the contact assemblies 4a, 4b in such a configuration takes place exclusively by way of the relative motion of the housing parts 26, 28 to one another and not by way of a motion of a contact assembly 4 in the housing 20 or in the housing part 26, 28 accommodating the contact assembly 4. This makes it easier to provide finger and/or touch protection conforming to standards. The housing parts 26, 28 that are displaceable relative to one another also overlap even when the greatest possible distance 8 between the two contact assemblies 4a, 4b has been assumed. In one configuration, the two housing parts 26, 28 overlap in the middle between the two contact assemblies 4a, 4b.

A contact assembly 4, as shown in FIGS. 1 and 2, can comprise a fastening element 32, for example, in the form of a screw 34. A screw shank 36 can be provided with a finger and/or touch protection 40 at its end 38. Fastening element 32 can be coated and/or covered with a finger and/or touch protection 40, at least at the points at which it is not in contact with power rail 20 or an electric module. The screw 34 can be fabricated from material having good electrical conductivity and can be part of a current path through the module connector 1 along which current flows from one to the other of the two electric modules 2. The screw 34 does not necessarily have to comprise a thread; instead of a thread, one or more latching elements or a bayonet lock can also be present.

Finger and/or touch protection 40 of screw head 42 can comprise one or more radially projecting ribs 44, shown in FIGS. 1 and 2, which extend in the radial direction to a collar 46, that is formed by housing 20 and that projects away from conductor assembly 10, against which they can abut. The inner contour of collar 46 is circular in an embodiment, but can also be polygonal. Rib 44 is circumferential in an embodiment and has an outer contour that is complementary to the inner contour of collar 46, so that finger and/or touch protection 40 of the screw head 42 closes the interior of collar 46 as a kind of cover and prevents direct access to conductor assembly 10. Collar 46 is part of the finger and/or touch protection 40 formed by housing 20.

With such a configuration, housing 20, in particular its collar 46, and screw head 42 at the same time can together form a guide or bearing point 47 for contact assembly 4a. Due to bearing point 47, fastening element 32 can be rotated about an axis of rotation 48, shown in FIG. 1, and is guided along axis of rotation 48 so as to be displaceable with respect to housing 20 and conductor assembly 10, but is fixated in other directions of motion. Such fixation ensures that no gaps arise that could allow for live parts to be touched.

With regard to conductor assembly 10 disposed opposite screw head 42, contact assembly 4 comprises a contact ring 50 which, as shown in FIGS. 1 and 2, can also be configured in a sleeve-shaped manner. Contact ring 50 is fabricated from material that conducts electricity very well, for example, a material made of or containing copper and/or aluminum. Fastening element 32 extends through contact ring 50. The contact ring 50 is part of the current path.

Contact ring 50, as shown in FIG. 1, can comprise a shoulder 52 which projects in the radial direction and which is received in a seat 56 of housing 20 or a housing part 26, 28 that is formed to be complementary. Shoulder 52 is therefore disposed between conductor assembly 10 and housing 20. The contact ring 50 can have a circular or polygonal base area or outer contour.

Contact ring 50 comprises a passage opening 58, shown in FIG. 2, which in an embodiment forms a further bearing point 60 for fastening element 32. Like at bearing point 47, fastening element 32 can be rotated by contact ring 50 at bearing point 60 about axis of rotation 48 and is guided in a displaceable manner along axis of rotation 48, but is otherwise fixated. Two bearing points 47, 60 are disposed opposite one another with respect to conductor assembly 20 and thereby prevent fastening element 32 from canting or becoming wedged in housing 20. A motion perpendicular to the axis of rotation 48 is blocked by the bearing points 47, 60.

Contact ring 50 is, in an embodiment, coupled rigidly with respect to direction of displacement 18 or a motion in plane 22, respectively, to fastening element 32. Contact ring 50 consequently moves along with fastening element 32 when fastening element 32 is displaced with respect to conductor assembly 10. In particular, the contact ring 50 can be combined in a manner displaceable in one piece with the remainder of the contact assembly 4. The direction of displacement can be predetermined, for example, by the direction of the oblong hole 64 described in detail below.

Contact ring 50 can be retained immovably in housing 20 or in a housing part 26, 28, so that it transfers the displacement of fastening element 32 of displaceable contact assembly 4a with respect to other contact assembly 4b to housing 20 or housing part 28. Bearing points 47, 60 therefore not only serve to guide fastening element 32, but also to transfer displacement 18 of displaceable contact assembly 4a to housing part 28 or a telescopic motion of housing 20 to contact assembly 4a, respectively.

The contact ring 50 touches the conductor assembly 10 at least in a state of the module connector 1 in which the latter is attached to the two electric modules 2. This enables the current flow via the contact ring 50. Additionally or alternatively, the fastening device 32 can also establish a conductive connection between the conductor assembly 10 and the electric module 2.

Housing 20 or a housing part 28, respectively, in an embodiment forms a collar 62 shown in FIG. 1 which is disposed opposite collar 46, projects toward electric module 2 or along axis of rotation 48 and projects beyond contact ring 50. Collar 62 is also part of the finger and touch protection provided by housing 20.

To enable the displaceability of contact assembly 4 in direction of displacement 18, conductor assembly 10 can be provided with a hole 63 shown in FIG. 2, in particular an oblong hole 64, through which contact assembly 4 or, if present, fastening element 32 extends. Contact assembly 4 is displaceable in hole 63 in direction of displacement 18. The displaceable contact assembly 4 is displaceable until it is completely fastened to the respective electric module 2.

Longitudinal direction 66 of oblong hole 64 in an embodiment corresponds to direction of displacement 18. Direction of displacement 18 or longitudinal direction 66, respectively, is directed towards the other contact assembly 4. It in an embodiment intersects pivot axis 24. Fastening element 32 is accordingly displaceable in oblong hole 64 while distance 8 changes. The displaceability of the fastening element 32 makes it possible to compensate for different distances between the battery modules 2 in a simple manner. Oblong hole 64, in an embodiment, is disposed in plane 22. The oblong hole 64 has a length 70 in the direction of displacement 18.

In order to always obtain the same or at least very little changing electrical transition resistance between electric modules 2, regardless of distance 8 between contact assemblies 4, the surface area of an in particular planar contact zone 68, in which conductor assembly 10 and contact ring 50 touch at least with module connector 1 attached to electric modules 2, is the same regardless of the relative position of contact ring 50 or contact assembly 4, respectively, and conductor assembly 10. Smaller changes in the surface area of contact zone 68 in the range of ±15% are still considered to be the same surface area. This configuration ensures that the transition resistance of the module connector 1 is independent of the displacement position of the contact assembly 4. Even large currents can then be transmitted regardless of the relative position of the contact assembly 4 and the conductor assembly 10.

One way of ensuring a constant surface area of contact zone 68 is that a length 10 of oblong hole 60 is less than or equal to the sum of half of diameter 72 of passage opening 58 of contact ring 50 and half of outer diameter 74 of contact ring 50 in plane 76 of contact zone 68. Moreover, a distance 78 between oblong hole 64 and end 80 of conductor assembly 10 closest to oblong hole 64 should be greater than or equal to half the difference between outer diameter 74 of the contact ring and diameter 72 of the passage opening in plane 76.

As already explained above, it is sufficient to have only one of two contact assemblies 4 be displaceable, i.e. extend, for example, through an oblong hole 64. Instead of an oblong hole 64, a hole which fixates non-displaceable contact assembly 4 in direction of displacement 18 or in plane 22 in a non-displaceable manner with respect to conductor assembly 10 can be present on non-displaceable contact assembly 4. However, in order to be able to compensate for larger changes in distance, it is also possible for both contact assemblies 4a, 4b to be of identical configuration and to be fastened to the conductor assembly 10 in a manner displaceable with respect to the conductor assembly 10. For example, both contact assemblies 4a, 4b can extend through holes 63, in particular oblong holes 64, of the conductor assembly 10 and can be displaceable in the holes 62.

In the configuration of FIGS. 1 and 2, conductor assembly 10 comprises a power rail 12 that is disposed end-to-end between contact assemblies 4, or conductor assembly 10 consists of an end-to-end power rail 12, respectively.

However, in another embodiment, it is sufficient to have a power rail be present only at displaceable contact assembly 4a or at both contact assemblies 4, as shown in FIG. 3. Conductor assembly 10 can comprise a flexible conductor 82 between these power rails 12a, 12b, for example, in the form of a woven fabric, knitted fabric, cable, or wire mesh. In the region of flexible conductor 82, the conductor assembly can have an arch 14, as in the case with end-to-end power rail 12. Otherwise, the configuration in FIG. 3 is identical to the configuration of FIGS. 1 and 2. The adaptation of the distance 8 between the contact assemblies 4a, 4b should be effected exclusively by displacement of the at least one displaceable contact assembly 4a relative to the conductor assembly 10 and without elastic deformation of the flexible conductor 82. This is the only way to keep the connection between the module connector 1 and the electric modules 2 free of force.

What is claimed is:

1. A module connector for electrically connecting a pair of electric modules, comprising:
   a pair of contact assemblies, each disposed, respectively, on one of the pair of electric modules and spaced from one another and the contact assemblies each having a fastening element having diameter and a first end external to the module connector and a second end connected to the electric modules;
   a rigid conductor assembly electrically connecting the contact assemblies along a longitudinal axis and, with the contact assemblies, forming an electrical connection between the electric modules, the conductor having two apertures at least one of the apertures being an oblong aperture having a width slightly larger than the diameter of the fastening element, wherein one of the contact assemblies is fastened to the conductor assembly in a manner displaceable relative to the conductor assembly in a single planar direction of displacement along the longitudinal axis directed towards and/or away from the other of the contact assemblies; and a housing formed of an electrically insulating material, and having an upper section comprising a touch protection surrounding the fastening element that extends through the upper section and a lower section enclosing the fastening element, thereby sealing the fastening element and the electric module from an external environment, wherein the contact assemblies and the conductor assembly are accommodated in the housing.

2. The module connector of claim 1, wherein the at least one of the contact assemblies that is displaceable is fixed in the housing in the direction of displacement.

3. The module connector of claim 1, wherein the at least one of the contact assemblies that is displaceable has a fastening element that is rotatable relative to the conductor assembly about an axis of rotation.

4. The module connector of claim 3, wherein the fastening element is retained in the housing in a manner displaceable along the axis of rotation relative to the conductor assembly.

5. The module connector of claim 4, wherein the fastening element is rotatable at a pair of bearing points spaced about the axis of rotation, the bearing points are disposed on different sides of the conductor assembly.

6. The module connector of claim 1, wherein the at least one of the contact assemblies that is displaceable has a contact ring that is displaceable relative to the conductor assembly.

7. The module connector of claim 6, wherein the contact ring and the conductor assembly touch in a contact zone, a surface area of the contact zone is the same regardless of a displacement of the conductor assembly in the direction of displacement relative to the contact ring.

8. The module connector of claim 6, wherein the at least one of the contact assemblies that is displaceable has a fastening element that is rotatable relative to the conductor assembly about an axis of rotation, the fastening element and the contact ring are connected in a manner not displaceable relative to one another in the direction of displacement.

9. The module connector of claim 5, wherein touch protection is part of one of the bearing points.

10. The module connector of claim 1, wherein the contact assemblies are identical and are both fastened to the conductor assembly in a manner displaceable relative to the conductor assembly.

11. A module connector for electrically connecting a pair of electric modules, comprising:
a pair of contact assemblies spaced from one another and fastening the module connector to the electric modules;
a conductor assembly electrically connecting the contact assemblies and, with the contact assemblies, forming an electrical connection between the electric modules, at least one of the contact assemblies is fastened to the conductor assembly in a manner displaceable relative to the conductor assembly in a direction of displacement directed towards and/or away from the other of the contact assemblies; and
a housing formed of an electrically insulating material, the contact assemblies and the conductor assembly are accommodated in the housing, wherein the housing is telescopic in the direction of displacement.

12. A module connector, for electrically connecting a pair of electric modules, comprising:
a pair of contact assemblies spaced from one another and fastening the module connector to the electric modules;
a conductor assembly electrically connecting the contact assemblies and, with the contact assemblies, forming an electrical connection between the electric modules, at least one of the contact assemblies is fastened to the conductor assembly in a manner displaceable relative to the conductor assembly in a direction of displacement directed towards and/or away from the other of the contact assemblies; and
a housing formed of an electrically insulating material, the contact assemblies and the conductor assembly are accommodated in the housing, wherein the housing has a pair of housing parts that are displaceable relative to each other in the direction of displacement.

13. The module connector of claim 12, wherein one of the housing parts projects into the other of the housing parts.

14. The module connector of claim 13, wherein the at least one of the contact assemblies that is displaceable is coupled rigidly to one of the housing parts along the direction of displacement.

15. The module connector of claim 1, wherein the conductor assembly has a power rail.

* * * * *